United States Patent
Juodis et al.

[15] 3,685,297
[45] Aug. 22, 1972

[54] APPARATUS FOR CONFINING FLOATING MATERIALS

[72] Inventors: Walter Juodis, Mishawaka, Ind.; George J. Gauch, Greenville, R.I.

[73] Assignee: Uniroyal, Inc., New York, N.Y.

[22] Filed: Dec. 7, 1970

[21] Appl. No.: 95,583

[52] U.S. Cl. ................................................. 61/1 F
[51] Int. Cl. .......................................... E02b 15/04
[58] Field of Search ....... 61/1 F, 5; 210/DIG. 21, 242

[56] References Cited

UNITED STATES PATENTS

| | | | |
|---|---|---|---|
| 3,067,712 | 12/1962 | Doerpinghaus | 61/5 |
| 2,682,151 | 6/1954 | Simpson | 61/1 F |
| 3,576,108 | 4/1971 | Rowland | 61/1 F |

*Primary Examiner*—Peter M. Caun
*Attorney*—Henry Sternberg

[57] ABSTRACT

An apparatus in which detachably connected floats form a barrier on the surface of a liquid for confining materials i.e. pollutants floating thereon. A plurality of adjacent floats are longitudinally arranged in an end-to-end relation. The end wall of at least one of the floats has a movable portion which is biased in a longitudinal direction toward the corresponding end wall of the next adjacent float so as to form a seal between adjacent floats. Each of the opposed end walls includes a portion adjacent the movable portion thereof for operatively securing together the floats, and for preventing the movable portions from moving apart further than a predetermined distance so as to maintain the movable portions in sealing engagement.

33 Claims, 9 Drawing Figures

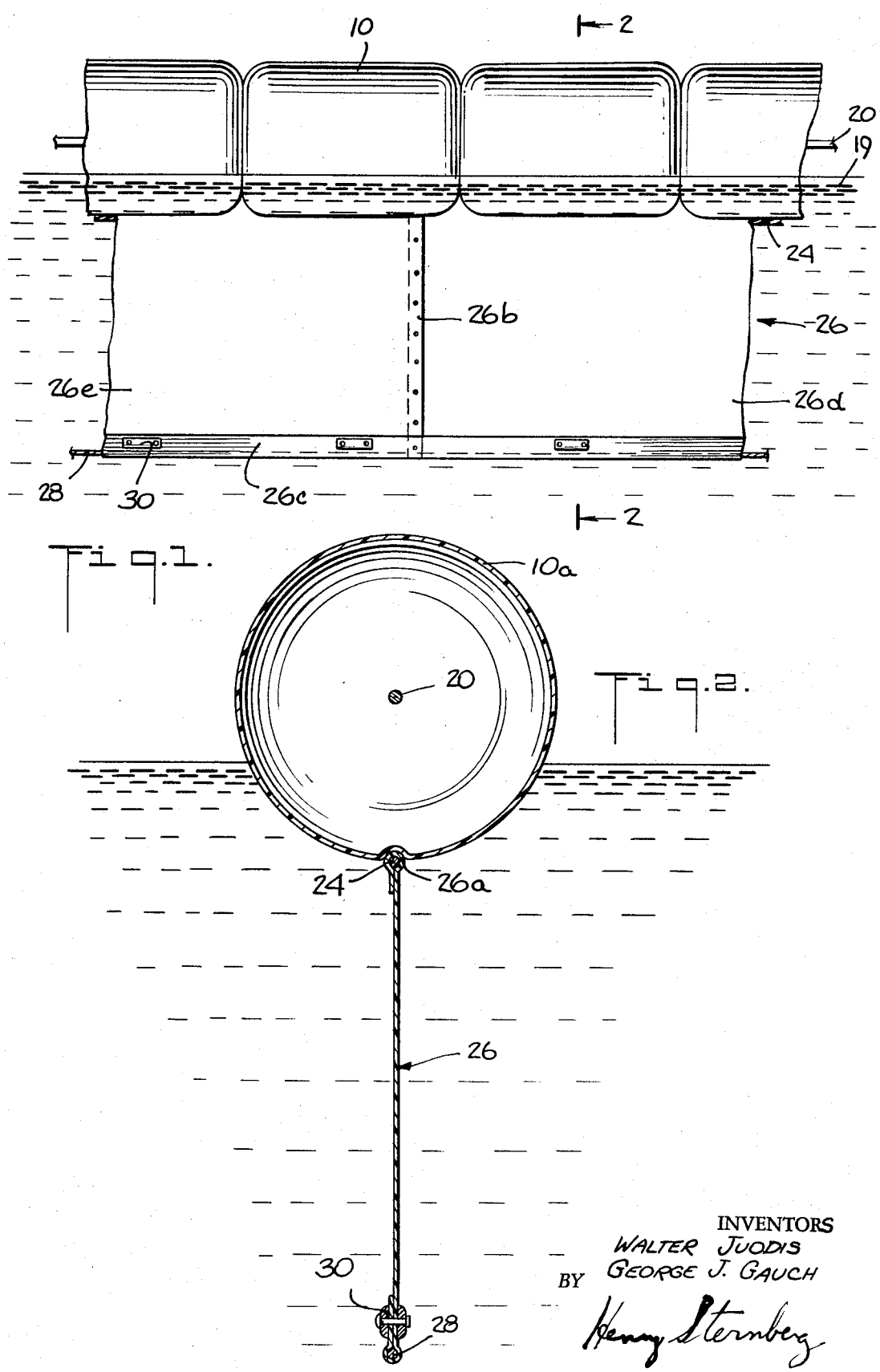

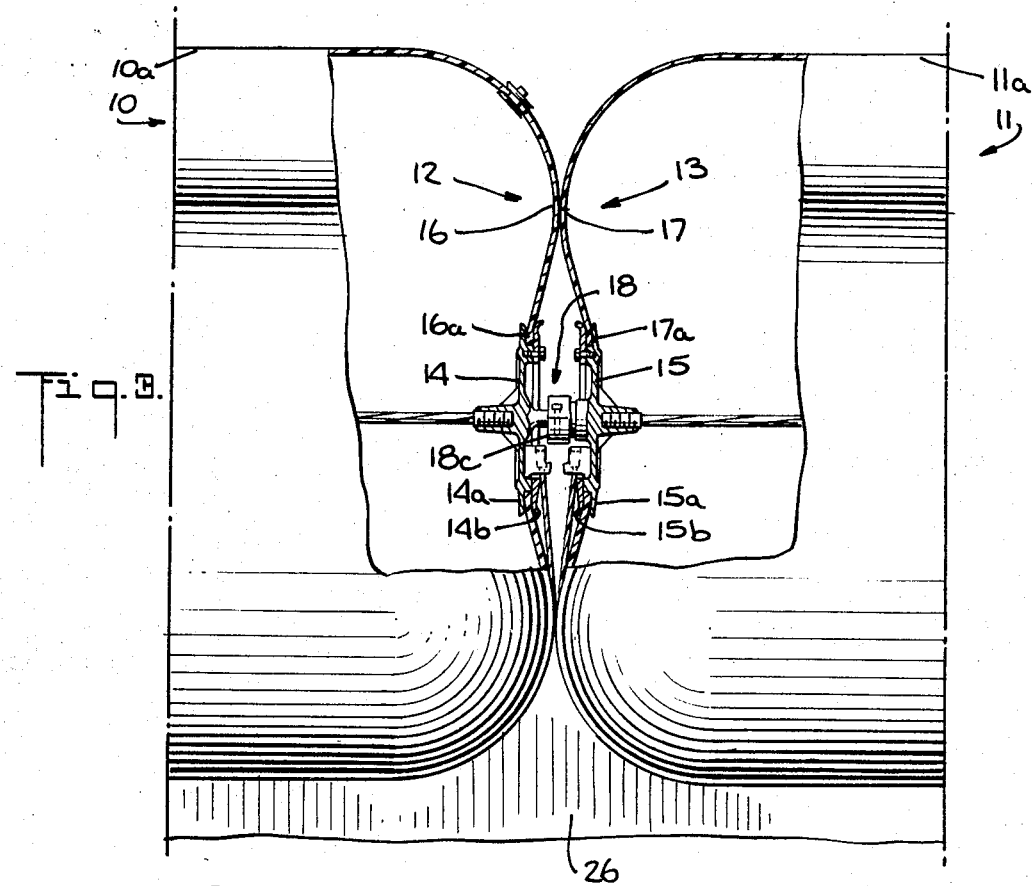
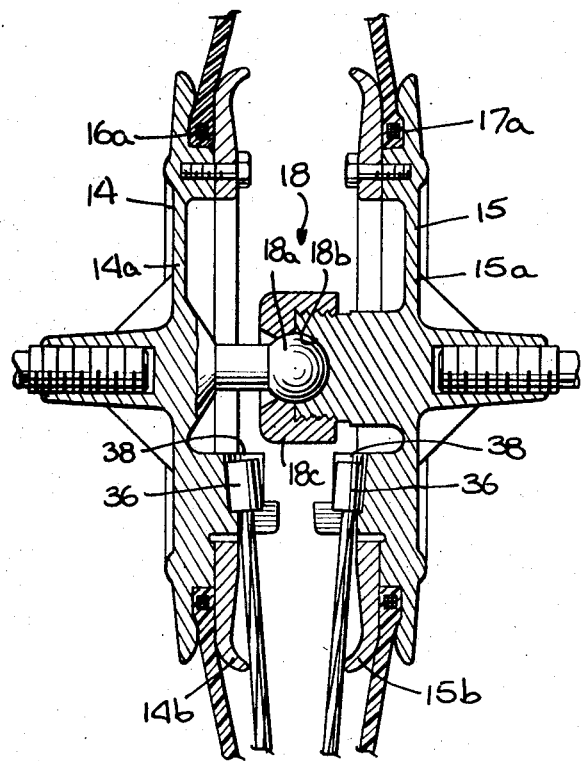
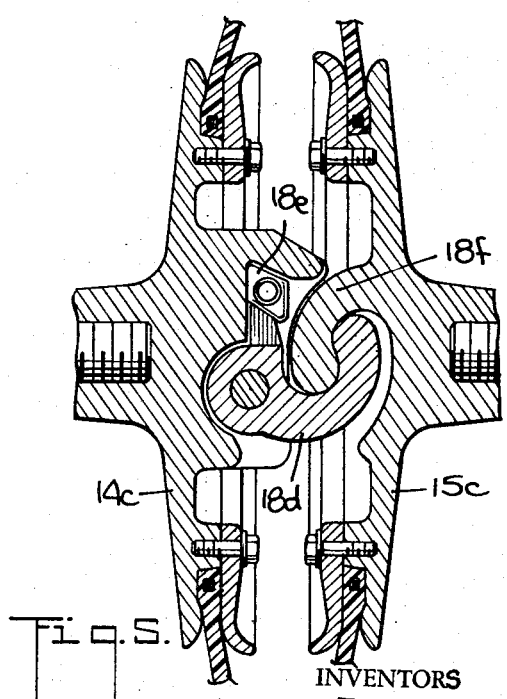

INVENTORS
WALTER JUODIS
GEORGE J. GAUCH
BY
Henry Sternberg

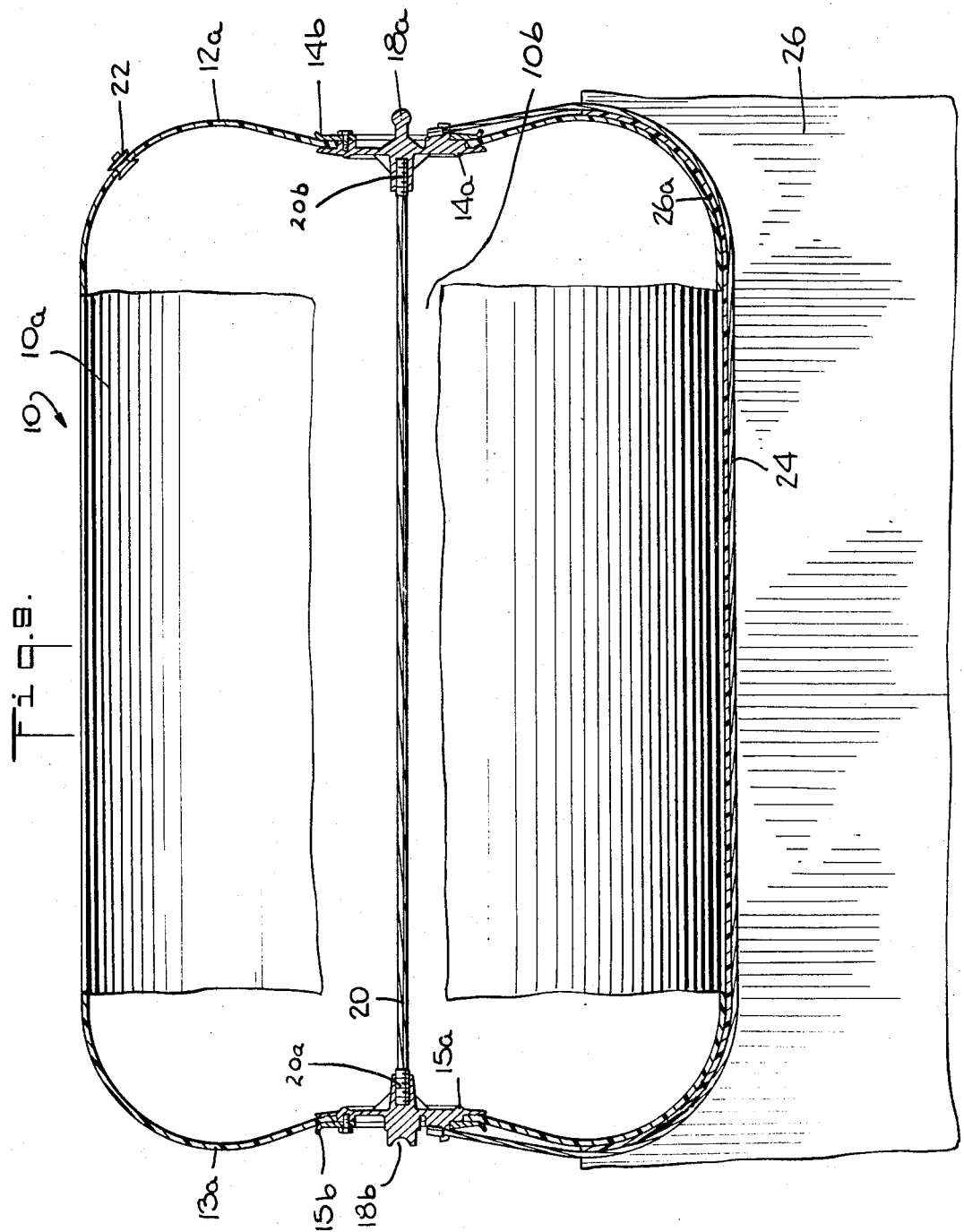

APPARATUS FOR CONFINING FLOATING MATERIALS

The foregoing abstract is neither intended to define the invention disclosed in the specification, nor is it intended to be limiting as to the scope of the invention in any way.

BACKGROUND OF THE INVENTION

The invention relates generally to an apparatus for confining material floating on a liquid, and more particularly concerns a system of modular float members for containing pollutants, such as oil, floating on rough sea water.

Liquid petroleum products constitute a dangerous pollution source. Since they have a density lower than water, they will float and be spread over wide areas. These floating liquids are a fire hazard and can seriously pollute nearby land areas. It is therefore highly desirable to restrict them as rapidly as possible to as small an area as possible in order to facilitate their recovery, minimize pollution and restrict the potential fire hazard.

Heretofore various methods and apparatus have been devised to confine material floating on the surface of a liquid. The function of such an apparatus is to prevent oil or similar products from spreading, thereby isolating the pollutant in an area where it can be removed from the surface. With the apparatus confining the oil, authorities can concentrate on cleaning it up by skimming it from the surface, applying straw to absorb the oil or spraying the oil with chemicals. Suitable apparatus is available which will adequately prevent the spread of pollutants floating on the surface of the relatively calm waters of rivers and harbors. However, such conventional apparatus does not perform adequately in the open where the waters are rough. As the size of the waves increases, the magnitude of the forces exerted on the apparatus increases. When the apparatus is subjected to forces of a sufficiently large magnitude, such as those generated in a very rough sea, the heretofore known apparatus may either break apart completely or fail to properly confine the floating pollutants. To resolve the difficulty noted above, large and unwieldly systems were developed so as to withstand the forces of the waves in the rough open sea. As a consequence thereof, many of the conventional systems now in use, are often difficult to transport to and handle at the site of pollution. Thus, a substantial period of time may often elapse before such conventional apparatus can be brought to and assembled at the site, thereby resulting in the spread of floating pollutants across large areas of the open sea and, by the greater difficulty in containing the spread, cause the subsequent pollution of land areas.

Accordingly, it is a primary object of the present invention to provide a float apparatus for forming a barrier on the surface of a liquid which will overcome the aforesaid disadvantages.

With more particularity, it is an object of the present invention to provide a float apparatus which uses modular construction so as to be readily transported to and assembled at the site of the pollutants.

Another object of the present invention is to provide a float apparatus which operates satisfactorily under the forces generated by the waves of a rough sea.

An additional object of the present invention is to provide a float apparatus which, while composed of modular float components, will maintain a generally continuous sealed system.

A related object of the present invention is to provide a float apparatus in which the individual modular components thereof are readily detachable form each other.

Similarly, it is another object of the present invention to provide a float apparatus having novel modular components which are readily assembled to each other so as to form a sealed floating system.

A further object of the present invention is to provide a float apparatus of the above type which may be readily transported to and assembled at the site in any desired length and just as readily dismantled and stored for future use.

Other objects include the provision of an improved apparatus of the above type which is relatively inexpensive to manufacture and maintain and may be easily manipulated in the repeated installation and use thereof.

Further objects and advantages of the invention will become apparent as the following description proceeds.

SUMMARY OF THE INVENTION

Briefly, in accordance with the invention there is provided a float apparatus which forms a barrier on the surface of a liquid, such as for example a body of water. The apparatus preferably includes a plurality of adjacent modular float members which are longitudinally aligned in end-to-end relation. Each of the float members has an end wall adjacent to and in substantial registry with a corresponding end wall of an adjacent float member. These adjacent end walls include opposing connecting portions for operatively coupling the float members to one another in a readily detachable manner. At least one of the float members has an end wall which includes a movable portion spaced from the aforesaid connecting portion, which may be resiliently urged or biased in a longitudinal direction toward the opposed end wall of the connected adjacent float so as to form a seal between the adjacent float members. Adjacent float members are coupled together at the connecting portion in such a manner as to restrain the movable portions of the end walls from moving apart further than a specified distance thereby insuring that the movable portions are maintained in sealing engagement.

Preferably the float members have a substantially cylindrical body portion connecting a pair of end walls and together defining an internal chamber. The end walls are connected to each other by a flexible, substantial inextensible, tension means, such as for example a cable, extending axially through the internal chamber. The tension means restrains the opposed connecting portions of the pair of end walls from moving apart further than a predetermined distance and provides tensile strength for the float members. The aforementioned float members form the basic modular unit from which the entire floating barrier may, according to the present invention, be constructed.

In accordance with a further aspect of the invention there is provided a substantially inextensible cable means extending along the exterior surface of the cylindrical body portion of the float members between the connecting portions of the pair of opposite end walls thereof. The cable is fixedly connected to the connecting portions of the end walls for supporting a vertically downwardly extending flexible sheet. The length of the cable is such that the outer surface of the cylindrical body portion is urged into engagement with and partially envelops the cable. An upper portion of the sheet is interposed between the cylindrical body portion and the cable so as to be pressed between the underside of the float member and the cable so as to form a liquid-tight seal. One of the features of the invention is to use a sheet so configured that it extends into the seal between corresponding movable portions of adjacent end walls of adjacent float members for preventing pollutants from passing not only beneath, but also between adjacent float members, from one side to the other side thereof, even when the latter are subjected to the forces of the waves in a rough sea.

Thus, according to the present invention there are provided modular float members for supporting a downwardly extending sheet. The modular float members are easily attachable to each other so as to form an enclosure of any desired size for confining floating pollutants therein. According to the preferred embodiment of the invention the modular float members are inflatable so as to enable the entire float apparatus to be easily transported in deflated condition and assembled at the site where it is desired to contain the pollutants.

BRIEF DESCRIPTION OF THE DRAWINGS

Other objects and advantages of the invention will become apparent upon reading the following detailed description and upon reference to the drawings, in which:

FIG. 1 is a partial elevational view of a series of connected modular float members supporting a vertically downwardly extending sheet according to one embodiment of the present invention;

FIG. 2 is an enlarged sectional view taken along the line 2—2 of FIG. 1 in the direction of the arrows;

FIG. 3 is an enlarged fragmentary sectional view showing a portion cutaway, of the seal and the connecting means according to one embodiment of the present invention;

FIG. 4 is an enlarged fragmentary sectional view showing a joint for connecting adjacent floats according to one embodiment of the present invention;

FIG. 5 is an enlarged fragmentary sectional view showing another joint for connecting adjacent floats according to another embodiment of the present invention;

FIG. 9 is an enlarged partially sectional view showing a modular float member according to one embodiment of the present invention.

Figures 6, 7:
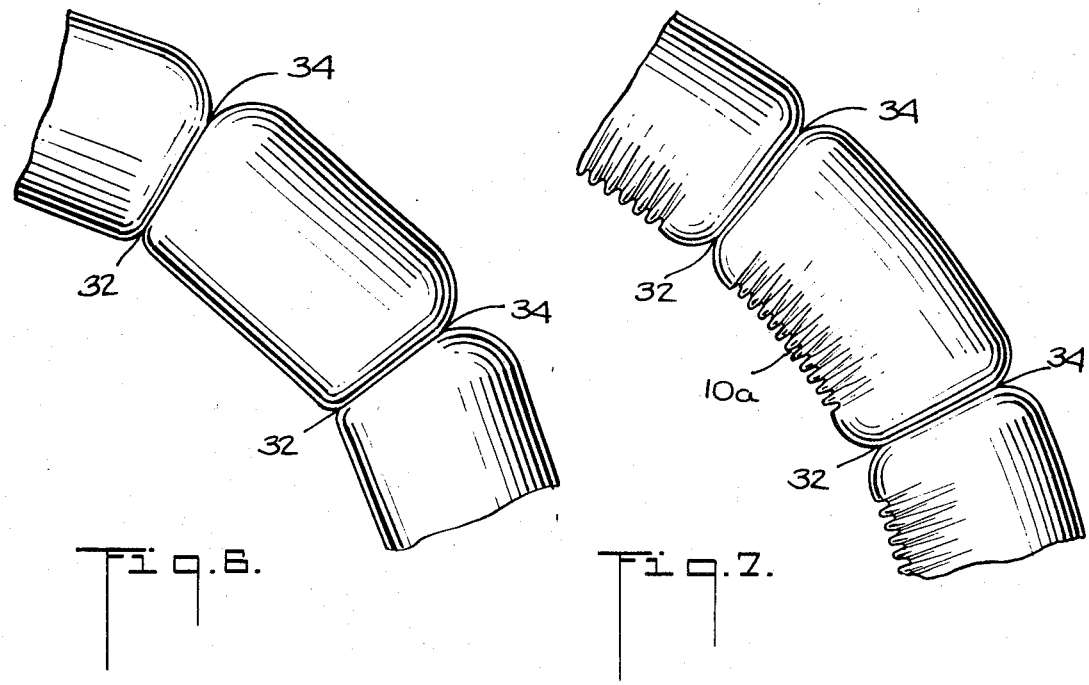
FIG. 6 is a partial plan view of several modular float members connected together by the joint shown in FIG. 4.
FIG. 7 is a partial plan view of several modular float members connected together by the joint shown in FIG. 5.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

With continued reference to the drawings, wherein like reference numerals have been used throughout to designate like elements, FIG. 3 illustrates a cutaway portion of a pair of adjacently positioned float members 10 and 11. In the illustrated embodiment, each of the float members 10 and 11 have end wall means shown generally as 12 and 13, respectively, which are adjacent to and in substantial registry with each other. The end wall means 12 and 13 include opposing first portions 14 and 15, respectively, and movable second portions 16 and 17, respectively, adjacent to he first portions 14 and 15.

Preferably, each of the float members 10 and 11 includes a shell or body portion 10a and 11a of a flexible air impervious material, such as a plastic coated or a rubber coated fabric capable of being inflated by a pressure fluid, such as for example compressed air. The fabric of the shell 10a and 11a preferably comprises arranged cords which insure that when the float member is inflated it assumes a generally cylindrical shape. For example, if the layers of fabric forming the cylindrical body portion 10a (FIG. 9) are disposed at the correct helical angles the body portion will not distort appreciably from the desired cylindrical shape when the float member 10 is inflated. The opposed movable second portions 16 and 17 of the end walls 12 and 13 of adjacent float members 10 and 11 are deformable toward and away from each other. The air used to inflate the float members 10 and 11 forms a biasing means for resiliently urging the deformable second portions 16 and 17 of the end wall means 12 and 13 respectively, toward each other. Connecting means, shown generally as 18, are mounted on the opposing first portions 14 and 15 of the end wall means 12 and 13 for operatively securing adjacent float members 10 and 11 together. The connecting means 18 forms, as will be described below, an inextensible connection between the floats 10 and 11 for securely holding the opposing portions 14 and 15 a given distance apart. Thus, the adjacent float members are secured together by the connecting means 18 in such a manner as to maintain the deformable second portions 16 and 17 of the end wall means 12 and 13 in sealing engagement when the float members 10 and 11 are inflated. As shown in FIG. 3, inflation of the float members 10 and 11 causes the deformable second portions 16 and 17 to be pressed against each other so as to form an annular seal. This annular seal surrounds the opposing first portions 14 and 15, and the connecting means 18 thereby preventing the introduction of any liquid into the vicinity of the opposing first portions 14 and 15, and connecting means 18 and also adds rigidity to the composite structure. Since the opposing first portions 14 and 15, and the connecting means 18 are normally made from a metal, the formation of rust or other contamination in the region of connecting means 18 is retarded by this annular seal arrangement. The prevention of rust or contamination in the vicinity of the connecting means 18 insures that adjacent float members 10 and 11 may be readily detachable and reusable after prolonged use in sea water.

Pursuant to the invention, as best shown in FIG. 3, the opposing first portions 14 and 15 include cable plates 14a and 15a and clamping rings 14b and 15b. The annular flexible second portions 16 and 17 have an innermost annular portion 16a and 17a interposed between the cable plates 14a and 15a, respectively, and the clamping rings 14b and 15b. Suitable fastening means are used to secure the clamping rings 14b and 15b to the cable plates 14a and 15a with the innermost portions 16a and 17a of the flexible second portions 16 and 17 securely clamped therebetween so as to form an air-tight seal.

Referring to FIG. 4, one embodiment of a joint for connecting adjacent float members 10 and 11 is therein depicted. The cable plate 14a mounted on one end of one of the adjacent float members 10 as heretofore described, has a coupling means, i.e. a ball portion 18a integral therewith and extending therefrom in the direction of the corresponding adjacent float member 11. Mating cable plate 15a mounted on the corresponding end of the adjacent float member 11, has a corresponding coupling means, i.e. a spherical socket portion 18b integral therewith for receiving the ball portion 18a so as to form a ball joint. The ball portion 18a is secured in the socket portion 18b by means of a split nut assembly 18c. The split nut 18c is adapted to be mounted on the neck of the ball portion 18b in order to permit the internally threaded portion of the split nut 18c to engage the externally threaded portion of the socket portion 18b, thereby pressing the ball portion 18a into the socket portion 18b for securing the ball portion 18a therein. The ball portion 18a is capable of rotating in the socket portion 18b after the split nut assembly 18c is fastened thereto. Thus, the ball joint is a relatively rigid, axially extending joint which while coupling adjacent float members to one another, permits pivotal movement of the float members with respect to each other at the ball joint. Attention is drawn to the fact that adjacent float members 10 and 11 are connected to each other in such a manner that disengaging the split nut 18c from the socket portion 18b detaches adjacent float members 10 and 11 from each other. Thus it is seen that the adjacent float members 10 and 11 may be readily secured to as well as easily separated from each other. It is to be noted that in the illustrated form the adjacent float members 10 and 11 may only be detached from or secured to each other when at least one of the float members is partially deflated, since otherwise the annular seal formed by opposing movable second portions 16 and 17, precludes access to the connecting means 18.

An alternate embodiment of a joint used for connecting adjacent float members 10 and 11 is shown in FIG. 5. The cable plate 14c mounted on one end of the float member 10 as heretofore described, is provided with a coupling means, i.e. a hook portion 18d, pivotably mounted thereto and extending therefrom in the direction of the adjacent float member 11. A push-pull stop 18e slidably mounted on the cable plate 14c engages the hook 18d in a first position so as to prevent the hook 18d from pivoting to an open position, i.e. away from the float member 10. The stop 18e is held in the first position by a suitable spring, not shown, mounted on the cable plate 14c. The stop 18e may be moved in a transverse direction against the action of the spring to a second position, not shown, for disengagement from the hook 18d. When the stop 18e is in the second position, the hook 18d may be pivoted from a closed position to an open position and conversely from an open position to a closed position. However, the hook 18d may not be pivoted relative to the cable plate 14c when the stop 18e is in the first position. Mating cable plate 15c mounted on the corresponding end of the adjacent float member 11 has a corresponding coupling means, i.e. a catch 18f integral therewith for receiving the hook 18d of the cable plate 14e so as to form a joint therewith. The joint, according to this latter embodiment, is a relatively rigid, axially extending joint which substantially prevents relative pivotal movement between the adjacent float members 10 and 11. In order to attach the adjacent float members 10 and 11 to each other, the stop 18c is moved to its second position and the hook 18d pivoted to its open position. Subsequently, adjacent float members 10 and 11 are abutted end-to-end against each other, whereupon the hook 18d is again pivoted to its closed position operatively engaging the catch 18f of the corresponding adjacent float member 11. After the hook 18d engages the catch 18f, stop 18e is moved to its first position for locking the hook 18d in its closed position in locking engagement with the catch 18f. As heretofore discussed, at least one of the float members must at least be partially deflated in order to gain access to the connecting means 18.

According to the latter embodiment i.e. FIG. 5, the positive locking action between the float member is accomplished by inflation of the latter urging the plates 14c and 15c in opposite directions, i.e. away from each other so as to insure that the hook 18d and catch 18f will remain in engagement with each other.

Turning now to FIG. 9, there is shown a modular float member 10 according to the preferred embodiment of the present invention. The modular float member 10 has opposed spaced end wall means 12a and 13a connected by a cylindrical intermediate body portion 10a together defining an internal chamber 10b. The float member 10 is buoyant and when in use floats on the surface of a liquid, such as a body of water.

The first end wall means 12a is preferably connected to the second end wall means 13a by a flexible, substantial inextensible, tension means 20, such as for example a cable, extending axially through the internal chamber 10b. In the preferred construction illustrated in FIG. 9, the cable 20 connects the cable plate 14a of the first end wall means 12a with the cable plate 15a of the second end wall means 13a so as to prevent the cable plates 14a and 15a from moving apart further than a fixed distance. In addition, the cable 20 provides substantial tensile strength to the float member 10 in order to assist it in resisting the forces generated by the waves of a rough sea. In the present instance the cable 20 is provided with rigid stud portions 20a and 20b at opposite ends thereof. These studs 20a and 20b have externally threaded portions for engaging internally threaded portions of the cable plates 14a and 15a, respectively. The cable 20, which is preferably made of steel and is typically about 1 inch in diameter, is fastened to the cable plates 14a and 15a, respectively prior to inflating the float member 10. An inflation valve 22 is built into each float member 10 so as to permit rapid inflation and deflation thereof. Thus, it will be seen that the cable 20, extending within the internal chamber 10b, connects opposing end wall means 12a and 13a so as to prevent the opposing end wall means 12a and 13a from moving apart further than a specified distance. A plurality of such float members 10 may be secured to each other by suitable connecting means 18, heretofore described and shown in FIGS. 4 and 5, which insure that the opposed portions of the end wall means of such adjacent float members do not move further apart than a predetermined distance. Thus, in accordance with one aspect of the invention, as best illustrated in FIG. 3, when adjacent modular float members 10 and 11 are connected together and subsequently inflated, the annular flexible portions 16 and 17 of the end walls 12 and 13 are resiliently urged or biased toward and into engagement with each other against the restraining force of the connecting means 18 so as to form an annular liquid-tight seal around the latter. Thus, the inextensible cables 20 may be connected, in line, with the inextensible connecting means for forming a plurality of float members into an elongated, longitudinally, inextensible float system.

Turning now once again to FIG. 9, it will be seen that a sheet support may be provided at the exterior of the float member. This sheet support is in the form of an additional substantially inextensible cable means 24 which extends along the exterior of the body portion 10a of the float member 10 between the end walls 12a and 13a, respectively. As best shown in FIG. 4, the cable means 24 is fixedly connected at opposite ends thereof to cable plates 14a and 15a, respectively. The end portions 36 (FIG. 8) of the cable means 24 are preferably swaged so as to be slidably received by corresponding slots in cable plates 14a and 15a, and suitable plates 38 may be fastened over each slot so as to lock the swaged ends 36 of the cable means 24 within their respective slots (FIG. 4). The length of the cable means 24 is such that upon inflation of the float member 10, the exterior or outer surface of the cylindrical body portion 10a presses into engagement with and partially envelops the cable means 24. As shown in FIG. 2, the cable means 24 supports a vertically downwardly extending sheet member 26. The upper marginal edge portion 26a of the sheet 26 is interposed between the body portion 10a of the float member 10 and the cable means 24. In response to inflating the float member 10, the exterior surface thereof presses against the upper marginal edge portion 26a of the sheet 26 in turn pressing the latter against the cable 29 so as to squeeze the upper marginal edge portion of the sheet in a liquid tight manner between the cable and the exterior surface of the float member.

Figure 8:
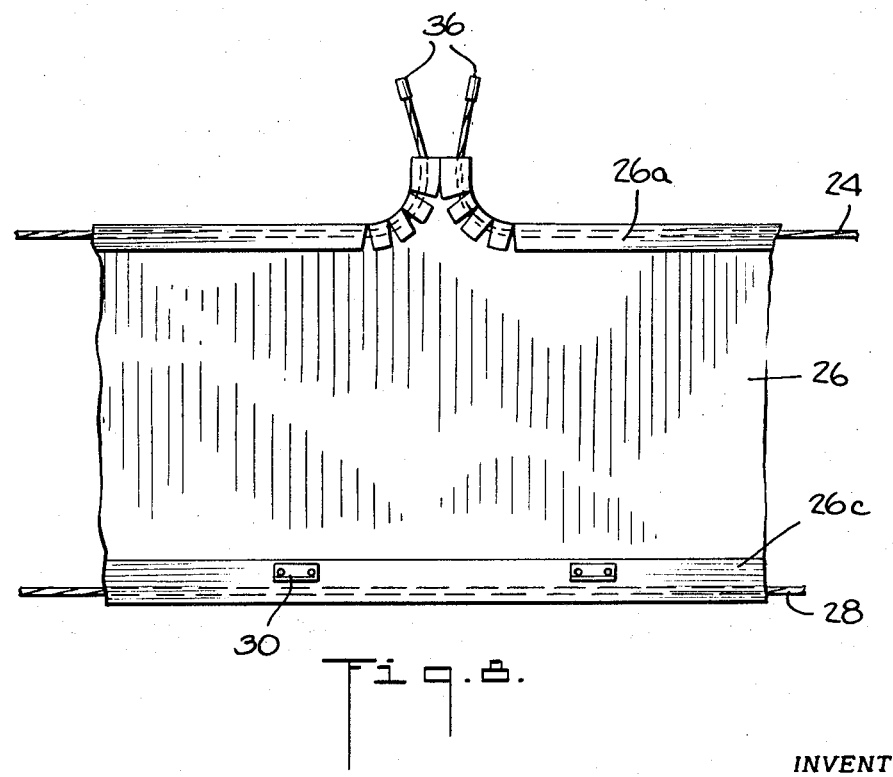
FIG. 8 is an elevational view showing the details of a portion of the sheet and cable means of FIG. 1.

Referring now to FIG. 8, the upper marginal edge portion 26a of the sheet 26 is folded over the cable means 24 and is cemented or otherwise suitably connected against itself so as to form a sleeve or overlap of about 3 inches in width, through which the cable means 24 extends. The sheet 26 is so configured as to extend in a vertically upward direction between adjacent float members 10 and 11, the sheet extending through the sealingly received in the annular seal region, thereby preventing pollutants from passing between adjacent float members 10 and 11. The lower marginal edge portion of the sheet 26 is folded over a bottom cable 28 and is cemented or otherwise suitably connected against itself so as to form a sleeve or overlapped portion 26c of about 3 inches in width, through which a bottom cable 28 extends. In the preferred embodiment, the bottom cable 28 is made of steel and is typically about 1 inch in diameter. The overlapped portion 26c may extend along the entire length of the sheet 26 and may be provided with a plurality of spaced holes extending completely therethrough for bolting ballast weights 30 thereto, as shown in FIG. 2. The sheet 26 is thus held in a substantially taut condition by the ballast weights 30 so as to extend vertically downwardly into the body of liquid.

Having considered the details of the modular components used in the float apparatus, attention may now be given to the entire system, as shown in FIG. 1, in inflated condition. The float apparatus includes a plurality of inflated modular float members 10, for example, a single float apparatus may include as many as 500 float members, of the type shown in FIG. 9 and described above. The members 10 float on the surface of a liquid 19, such as a body of water, for example a lake, river of sea. The series of float members 10 are mechanically linked together at adjacent end walls thereof, with the annular flexible portions of the abutting end walls of adjacent float members 10 being pressed into each other by the internal pressure within each inflated float member 10 so as to form an annular seal between adjacent float members 10 and generally to add rigidity to the overall system. Various means for mechanically linking or connecting adjacent float members 10 have been heretofore discussed and are shown in FIG. 4 and FIG. 5 respectively. Similarly, the annular seal between adjacent float members 10 has been previously described and is depicted in detail in FIG. 3. Upon further inspection of FIG. 1 it will be seen that the sheet 26 preferably is made up of individual sheet sections 26d and 26e, each preferably associated with eleven float members, i.e. extending along approximately the length of 11 floats. The length of the individual sheet sections may vary to suit the convenience of manufacturing and handling. Each of such sheet sections has opposed vertical marginal edge portions 26b preferably which are overlapped and fastened together in the region spaced from the interface between adjacent float members, i.e. approximately about 18 inches therefrom. This vertical joint, formed by overlapping the vertical marginal edge portions 26b, occurs at approximately about every eleventh float member 10 and forms a substantially fluid-tight seal. As hereinbefore set forth the sheet 26, located at the underside of the float members 10 and supported thereby is made up of a series of flexible waterproof panels which may be of plastic coated or rubber coated fabric. A sufficient number of these panels are used so that they extend the entire length of the apparatus. The vertical height of the sheet is chosen such as to provide an effective barrier to pollutants floating on the surface of the liquid 19. A plurality of ballast weights 30 are secured to the overlapped lower marginal edge portion 26c of the sheet. These ballast weights 30 maintain the sheet in a relatively stable vertically downward direction. In order to tow the apparatus through the liquid 19, a bridle, not shown, may be fastened to the accessible extremities of one of the end float members 10, the corresponding end of the lower marginal edge portion 26c of the sheet 26, and the corresponding end of the bottom cable 28. Similarly, in order to maintain the apparatus in a predetermined location at the site of the pollution, an anchoring device, not shown, may be fastened to the bottom cable 28. Thus, if desired, the float apparatus may be assembled and inflated at a convenient location and subsequently towed, on the surface of the liquid 19, in its assembled and inflated condition, to the site of the pollution where it may be anchored in place.

It is contemplated that the float members 10 may be preferably connected to each other by either the joint shown in FIG. 4 or FIG. 5 so as to form an easily assembled endless enclosure surrounding the floating pollutants. Turning now to FIG. 6, each of the float members 10 illustrated therein is connected to the other by the joint depicted in FIG. 4, as heretofore discussed. As discussed previously the ball portion 18a is free to rotate in the socket portion 18c enabling adjacent float members to pivot with respect to one another. As shown in FIG. 6, the float members 10 are pivoted relative to each other at the joint in order to achieve an arcuate enclosure. Thus, the interior portions 32 of the end wall means of adjacent float members are pressed against each other with substantially greater force than the exterior portions 34 thereof. As a result of this variation in force, the contact area of the seal substantially varies about the periphery of the annulus, the interior portion 32 having substantially greater contact area than the exterior portion 34, but the seal being nevertheless maintained throughout the annular region.

Now referring to FIG. 7, each of the float members 10 shown therein is connected to the other by the joint depicted in FIG. 5, as described previously. As heretofore mentioned, the hook 18d is in engagement with the catch 18f. This type of joint permits relatively little or no pivotal movement between adjacent float members as the hook 18d is not free to rotate relative to the catch 18f. Since the joint illustrated in FIG. 5 does not permit the float members 10 to pivot relative to each other, an arcuate enclosure may nevertheless be formed by having the individual float members themselves bend in accordian fashion along their respective body portions. In this manner, the interior portions 32 of the end walls of adjacent float members are pressed against each other with substantially the same force as the exterior portions 34 thereof. The joint shown in FIG. 5, therefore, maintains the contact area of the annular seal substantially equal over all portions-thereof.

It is clear from the foregoing description that the herein described apparatus achieves the objectives of the present invention. Not only is the float apparatus composed of individual modular float members and individual sheet sections which may readily transported and/or stored in relatively small packages but in their deflated condition, the float members are flexible and may be made to assume an even smaller shape in order to permit easy storage and/or transportation thereof. In use, the float members cooperate with the sheet to provide an effective barrier for preventing the spread of floating pollutants. The float apparatus includes a plurality of modular components, the individual float members and the sheet sections. By adding or subtracting modular float members and sheet panels any desired length of barrier may be readily obtained. The modular components may be easily attached to one another, preferably prior to being placed in the water, and the modular float members are thereafter inflated. The apparatus utilizes the internal air pressure within each modular float member for pressing adjacent float members end-to-end against each other so as to maintain a liquid-tight seal therebetween and to add rigidity to the overall structure. Similarly, the internal air pressure within each modular float member is used to press the upper marginal edge portion of the downwardly depending sheet tightly between the underside of each modular float member and the sheet support cable. It is therefore apparent that the float members, in conjunction with the sheet depending therefrom, form a continuously sealed floating system comprised of modular components. The cable interiorly connecting opposite end wall means of each float member provides additional strength to resist lengthwise deformation when the apparatus is subject to large forces die to the waves of a rough sea. As a result of the utilization of modular components, individual components, such as float members or sheet panels, may be repaired and/or replaced at will with a minimum of effort and cost. In addition, an apparatus constructed in accordance with the invention has substantially reduced manufacturing the transportation costs, and may be readily used maintenance-free over extended periods of time. In this way a relatively easily manufacturable, maintenance free enclosure may be formed form modular components. An enclosure so formed has no openings through which pollutants can pass thereby providing an improved barrier for confining floating pollutants.

It will further be understood that while described herein in connection with inflatable float members, the present invention is not limited to such. For example, float members having movable annular end wall portions and filled at least at the end wall region thereof with elastically deformable, i.e. foam rubber material are intended to be included within the scope of the present invention.

Thus it is apparent that there has been provided, in accordance with the present invention, an apparatus for confining pollutants floating on rough sea water that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

Having thus described our invention, what we claim and desire to protect by Letters Patent is:

1. A float apparatus for forming a barrier on the surface of a liquid, comprising:

a pair of float members, each having an end portion, said end portions each having a first wall portion and a second wall portion surrounding said first wall portion;

coupling means associated with said first wall portions of said pair of float members for operatively coupling the latter together at said first wall portions thereof and for constraining said first wall portions of the coupled pair of float members against movement away from each other further than a given distance;

at least one of said float members being inflatable, said second wall portion of said one float member being adapted to expand toward and into engagement with said second wall portion of the other of said pair of float members and to be maintained in circumferential engagement with the latter in response both to the inflation of said one float member and to the constraint to said given distance effected by said coupling means, whereby there is formed between said first wall portions of said float members a substantially enclosed chamber for containing said coupling means.

2. The apparatus recited in claim 1, wherein said second wall portion of said one float member comprises a substantially annular flexible portion surrounding said first wall portion thereof.

3. The apparatus recited in claim 1, wherein each of said float members further comprises a second end portion spaced from said first mentioned end portion thereof, and an intermediate substantially cylindrical body portion connecting said spaced first and second end portions of the respective float members, said coupling means coupling said float members substantially along the axes thereof.

4. The apparatus recited in claim 1, wherein said second portion of said one float member is flexible and is adapted to resiliently deform into sealing engagement with said second wall portion of said other of said pair of float members.

5. The apparatus recited in claim 4, wherein said second wall portion of said other float member comprises a substantially annular resilient portion surrounding the corresponding first portion thereof.

6. The apparatus recited in claim 1, wherein said one float member further comprises a second end portion spaced from said first mentioned end portion thereof, and having a first wall portion spaced from said first wall portion of said first end portion thereof, and said one float member further including an intermediate substantially cylindrical body portion connecting said spaced end portions and defining therewith an internal chamber.

7. The apparatus recited in claim 6, wherein said one float member further comprises an elongated substantially inextensible tension means extending substantially axially through the internal chamber thereof and operatively connected at opposite ends thereof to said first wall portions of said first and said second end portions thereof, respectively, so as to restrain said first wall portions from moving further apart than a distance substantially equal to the length of said tension means.

8. The apparatus recited in claim 1, wherein said coupling means comprises readily engageable and disengageable means for readily engaging and disengaging said pair of float members from each other.

9. The apparatus recited in claim 1, wherein each of said pair of adjacently positioned float members further comprises a second end portion spaced from the respective first mentioned end portion thereof and an intermediate substantially cylindrical body portion connecting said spaced end portions of each float member, respectively and defining therewith an internal chamber adapted to be filled with a pressure fluid, said second portions of the adjacent ones of said first mentioned end portions of said pair of float members being flexible and deformable toward one another in response to admission of a pressure fluid into the internal chambers respectively, of said pair of float members.

10. The apparatus recited in claim 1, wherein said one float member includes a second end portion opposite said first mentioned end portion thereof and spaced therefrom and having a first wall portion spaced from said first wall portion of said first end portion thereof, said one float member comprising a substantially cylindrical shell of flexible air impervious material defining with said first and second end portions thereof an internal chamber adapted to be filled with air under pressure, said one float member further including cable means extending along the exterior of said one float member between said first wall portions of said opposite first and second end portions thereof and fastened at opposite ends thereof to said first wall portions respectively, the length of said cable means being such that when said one float member is inflated, portions of the exterior surface of said cylindrical shell are urged into engagement with and partially envelop said cable, along the length thereof, said apparatus further comprising a sheet member having an upper marginal edge portion extending along and adjacent to said exterior surface portions of said float member and said sheet member extending away from said shell in a substantially radial plane with respect to the axis of said shell, said marginal edge portion of said sheet member being located between said cable means and said exterior surface portion of said shell whereby said cable means press said marginal edge portion of said sheet member into sealing engagement with said exterior surface portion of said shell.

11. The apparatus recited in claim 10, wherein said one float member further comprises a flexible substantially inextensible tension means extending substantially axially through the internal chamber thereof and operatively connected at opposite ends thereof to said first wall portions of said first and second end portions thereof, respectively, so as to restrain said first wall portions from moving further apart than a distance substantially equal to the length of said tension means.

12. The apparatus recited in claim 11, wherein said sheet member is flexible, said apparatus further comprising weight means adapted to be secured to the lower marginal edge portion of said sheet member so as to maintain said sheet member in a substantially vertically downwardly direction.

13. The apparatus recited in claim 12 wherein said second end portion of said one float member comprises a flexible second wall portion, said latter second wall portion being resiliently deformable in response to inflation of said one float member.

14. The apparatus recited in claim 1, wherein each of said pair of float members comprises a substantially cylindrical shell of flexible air impervious material defining an internal chamber adapted to be filled with pressure fluid, each of said float members including a second end portion opposite said first end portion thereof and spaced therefrom, said second end portions each including a first wall portion opposite said first wall portion of said first end portion of the corresponding float member, each of said float members further including cable means extending along the exterior thereof between said opposite first wall portions thereof, the length of said cable means being such that when said float members are inflated said shells will have portions of their exterior surfaces adjacent said cable means urged into engagement with an partially enveloping said cable means, and said apparatus further comprising a vertically downwardly extending sheet member having its upper marginal edge portion fastened to said cable means and interposed between said cable means and said exterior surface portion of said shell, said cable means pressing said upper marginal edge portion of said sheet member into sealing engagement with said exterior surface portion of said shell.

15. The apparatus recited in claim 14, wherein each of said float members further comprises a flexible substantially inextensible tension means extending substantially axially through the internal chamber thereof and operatively connected at opposite ends thereof to said first wall portions of said first and second end portions thereof respectively, so as to restrain said first wall portions from moving further apart than a distance substantially equal to said tension means.

16. The apparatus recited in claim 15, wherein said sheet member is a flexible material and further comprises weight means secured to the lower marginal edge portion of said sheet member so as to maintain said sheet member extending in a substantially vertically downwardly direction.

17. The apparatus recired in claim 16, wherein said second end portions of each of said float members comprises a movable second wall portion, resiliently deformable in response to inflation of the respective float member.

18. The apparatus recited in claim 1, wherein said one float member further comprises a spaced second end portion including a first wall portion spaced from said first end portion thereof, an intermediate substantially cylindrical body portion of deformable material connecting said spaced end portions, and said cylindrical body portion expanding radially outwardly in response to inflation of said one float member, said one float member further comprising cable means extending along an exterior surface portion of said one float member between said first wall portions of said spaced end portions thereof and fastened at its opposite ends to said first wall portions,, respectively, the length of said cable means being such that in response to the expansion of said body portion said exterior surface portion of said body portion is urged into engagement with and partially envelops said cable means, and said apparatus further comprising a vertically downwardly extending sheet member, said sheet member having its upper marginal edge portion interposed between said cable means and said exterior surface portion of said cylindrical body portion, said cable means pressing said upper marginal edge portion of said sheet member into sealing engagement with said exterior surface portion of said body portion.

19. The apparatus recited in claim 1, wherein said one float member further comprises a spaced second end portion and an intermediate substantially cylindrical body portion of flexible material connecting said first and second end portions and defining therewith an internal chamber, cable means extending along the exterior surface portion of said float member between said first and second end portions and having opposite ends thereof fastened to said first and second end portions respectively, the length of said cable means being such that the latter substantially conforms to the exterior outline of said float member in a substantially radial plane, said apparatus further comprising a vertically downwardly extending flexible sheet member having upper marginal edge portions fastened to and extending along said cable means.

20. The apparatus recited in claim 19, wherein said one float member further comprises a flexible substantially inextensible tension means extending substantially axially through the internal chamber thereof and operatively connected at opposite ends thereof to said first and second end portions.

21. The apparatus recited in claim 1, wherein each of said float members is inflatable, said float members each further comprising a second end portion spaced from the corresponding first end portion thereof and having a first wall portion spaced from said first wall portion of said first end portion thereof, and each of said float members further including an intermediate substantially cylindrical body portion connecting said spaced first and second end portions and defining therewith an internal chamber.

22. The apparatus recited in claim 21, wherein each of said float members further comprises an elongated substantially inextensible tension means extending substantially axially through the internal chamber thereof and operatively connected at opposite ends thereof to said first portions of said first and second end portions thereof, respectively, so as to restrain said first portions of each of said float members from moving further apart than a distance substantially equal to the length of said tension means.

23. The apparatus recited in claim 22, wherein said coupling means are adapted to prevent relative axial movement between said pair of adjacent float members.

24. The apparatus recited in claim 23, wherein said coupling means includes means for permitting pivotal movement between said adjacent float members.

25. The apparatus recited in claim 23, wherein said coupling means include means for substantially preventing pivotal movement between said adjacent float members.

26. As an article of manufacture, an expansible and contractible float member for forming a barrier on the surface of a liquid, comprising:

a pair of opposed end wall means spaced from each other, said pair of end wall means including opposing first portions respectively, and at least one of said end wall means including a movable second portion spaced from said first portion thereof and movable away from the other of said end wall means in response to inflation of said member;

an intermediate shell portion connecting said spaced end wall means and defining therewith an internal chamber adapted to be filled with pressure fluid;

a flexible substantially inextensible tension means extending substantially axially through the internal chamber of said float member and operatively connected at opposite ends thereof to said first portions of said pair of end walls means respectively, so as to restrain said first portions from moving, in response to inflation of said float members, further apart than a distance substantially equal to the length of said tension means;

coupling means provided on each of said pair of end wall means, said coupling means being adapted to readily engage and disengage said float member with other float members placed in adjacency therewith; and cable means extending along the exterior of said movable second portion and said cylindrical body portion between said first portions of said spaced end wall means, and fastened at opposite ends thereof to said first portions respectively, the length of said cable means being such that said cable means will conform to and be in engagement with said body portion in response to inflation of said float member; and a sheet member having an upper marginal edge portion thereof fastened to said cable means.

27. The float member recited in claim 23, wherein said other end wall means comprises a movable second portion spaced from said first portion and movable in directions toward and away from said one end wall means, said movable second portion of said other end wall means being adapted to be urged in a direction away from said one end wall means in response to inflation of said member.

28. The float member recited in claim 27, wherein said second portions of said pair of end wall means are resiliently deformable in direction away from each other in response to inflation of said float member.

29. As an article of manufacture, a float member for forming a barrier on the surface of a liquid comprising;

a pair of opposed end wall means spaced from each other including opposing axially spaced substantially rigid first portions;

a substantially cylindrical shell of flexible air impervious material extending between and connecting said end wall means and defining therewith an internal chamber adapted to be filled with a pressure fluid;

a flexible substantially inextensible tension means extending substantially axially through the internal chamber and fixedly connected at opposite ends thereof to said first portions of said pair of end wall means respectively, so as to restrain said first portions from moving further apart than a distance substantially equal to the extended length of said tension means;

coupling means operatively associated with each of said pair of end wall means, respectively, and adapted to couple and uncouple said float member to float members which may be placed in adjacency therewith;

cable means extending along the exterior surface of said shell between said coupling means and fastened to the latter, the length of said cable means being such that when said float member is inflated, at least a substantial portion of said exterior surface portion thereof will be urged into engagement with and will partially envelop said cable means; and downwardly extending sheet means having an upper marginal edge portion thereof interposed between said cable means and said exterior surface portions of said shell, said cable means pressing said upper marginal edge portion of said sheet means into sealing engagement with said exterior surface portions, said sheet means being of a flexible liquid impervious material.

30. The float member recited in claim 29, wherein said pair of end wall means comprise opposing flexible annular second portions spaced from said first portions and deformable away from each other in response to the pressure fluid filling the internal chamber, said opposing annular second portions surrounding the corresponding first portions respectively.

31. The float member recited in claim 30, further comprising a cable means extending along the exterior surface portion thereof between said opposed first portions and fastened to the latter, the length of said cable means being such that when said float member is inflated, said exterior surface portion thereof will be urged into engagement with and will partially envelope said cable means.

32. The float member recited in claim 31, further comprising a vertically downwardly extending sheet member having an upper marginal edge portion thereof interposed between said cable means and said exterior surface portions of said float member, said cable means pressing said upper marginal edge portion of said sheet member into sealing engagement with said exterior surface portions, said sheet member being of a flexible liquid impervious material.

33. A float member comprising:

fluid-tight inflatable and contractible container means having a pair of opposed end walls and an intermediate shell portion connecting said end walls and defining therewith an internal chamber adapted to be filled with pressure fluid;

a pair of coupling means connected to the respective mid-portions of said end walls;

each of said end walls having a deformable second wall portion surrounding the corresponding mid-portion thereof and deformable outwardly toward an adjacent float member in response to inflation of said container with pressure fluid;

first elongated substantially inextensible means extending through said internal chamber and operatively connected at opposite ends thereof to the respective ones of said mid-portions so as to restrain the latter from moving further apart than a distance substantially equal to the length of said first elongated substantially inextensible means, said second wall portions, in expanded condition, extending outwardly beyond said mid-portions to form each of said end walls into convex-concave shape;

second elongated substantially inextensible flexible means extending along the exterior of said intermediate shell portion and connected at opposite ends thereof to said pair of coupling means respectively, said second elongated means being at least no longer in length than the shortest distance between said coupling means, measured along the outer surface of said container means when the latter is in inflated condition, whereby said second elongated flexible means engages and is partly enveloped by the outer surface of said shell portion between said pair of coupling means when said container is in inflated condition.

* * * * *

UNITED STATES PATENT AND TRADEMARK OFFICE
CERTIFICATE OF CORRECTION

PATENT NO. : 3,685,297
DATED : August 22, 1972
INVENTOR(S) : WALTER JUODIS ET AL.

It is certified that error appears in the above-identified patent and that said Letters Patent are hereby corrected as shown below:

Column 2, line 7, for "form" read --from--; line 57, for "substantial" read --substantially--. Column 6, line 23, for "18c" read --18e--. Column 8, line 1, for "the" read --and being--. Column 9, line 63, after "may" read --be--. Column 13, line 16, for "an" read --and--; line 42, for "recired" read --recited--. Column 15, line 33, for "23" read --26--. Column 16, lines 25-41, cancel claims 31 and 32.

Signed and Sealed this

Tenth Day of May 1977

[SEAL]

Attest:

RUTH C. MASON
*Attesting Officer*

C. MARSHALL DANN
*Commissioner of Patents and Trademarks*